J. W. BLAKE
CULTIVATOR OR HORSE-HOE.
No. 121,228.                              Patented Nov. 28, 1871.
Fig. 1
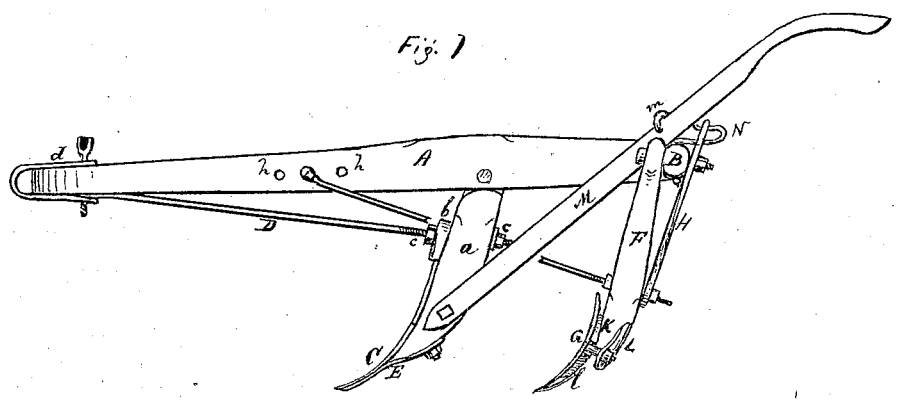
Fig. 2
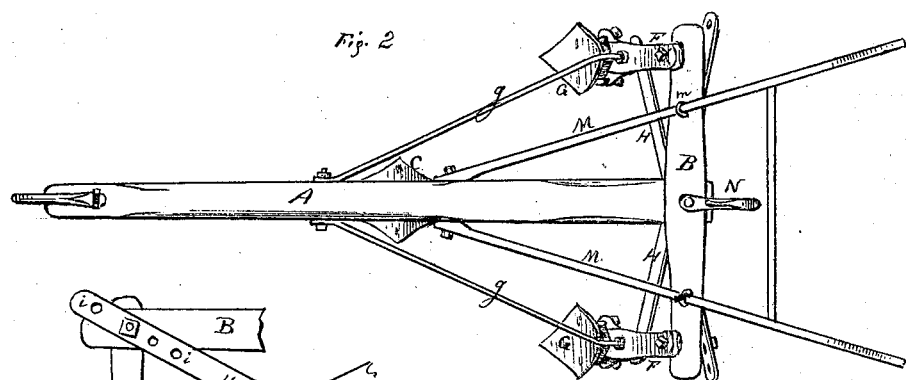
Fig. 3
Witnesses:
J. M. Ellsworth
A. C. Rawlings
Inventor:
J. W. Blake
By Hill & Ellsworth
Attorneys.

UNITED STATES PATENT OFFICE.

JOHN W. BLAKE, OF JEFFERSON, WISCONSIN.

IMPROVEMENT IN CULTIVATORS AND HORSE-HOES.

Specification forming part of Letters Patent No. 121,228, dated November 28, 1871; antedated November 17, 1871.

*To all whom it may concern:*

Be it known that I, JOHN W. BLAKE, of Jefferson, in the county of Jefferson and State of Wisconsin, have invented certain new and useful Improvements in Cultivators or Horse-Hoes; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

Figure 1 represents the side elevation, and Fig. 2 the plan of the machine. Fig. 3 is a rear elevation of one of the side arms of the said machine.

The nature of my invention consists principally in the general adjustability of the various parts of my cultivator or horse-hoe, adapting it to cultivate deep or shallow, wide or narrow—to cultivate level or to hill up, or take away the soil from rows of plants. It consists, also, in various improvements in the details of the machine, as will be hereinafter fully explained.

The frame of the machine consists of beam A and cross-head B. The arm or standard $a$ of the central or main shovel C is partially tenoned in the beam A and pinned to it, forming a loose joint, and is adjustable by means of washer $b$ and nuts $c\ c$ placed on the draft-rod D, passing from the bolt of clevis $d$ of the machine toward and through the standard $a$. By this connection of the pivoted standard the draft upon the latter is communicated directly from the clevis instead of the beam, and the joint or pivot of said standard is consequently relieved of strain and prevented from being broken. This arrangement is of the utmost importance, inasmuch as the pivot is necessarily small in order to produce the joint. The washer $b$, at the same time, is so arranged as to form a cap to the upper point of the shovel C to hold it in place. By operating the nuts $c\ c$ any desirable pitch is given to the shovel C. E is a brace or plate, welded underneath to the point of the shovel C, strengthening the said point, and is extended upward, if desirable, and bolted to the standard $a$, strengthening the attachment of the shovel to the standard. F F are side arms or standards of the shovels G G, bolted to the ends of the cross-head B. The desirable pitch to these shovels or their standards is given by draft-rods $g\ g$, the forward ends of which may be shifted back and forth by placing their bolts into one or the other of the holes $h\ h$ made in the beam A. The distance between the said shovels is adjusted by cross-braces H H, bolted at one end to the standards F F and at the other end to the cross-head B, and provided at their upper ends with several holes, $i\ i$, to change the position of their bolts. There are two clips, K and L, by means of which each of the shovels G G is secured to its standard. The front clip, K, is shaped so as to fit the back of the shovel and the shape of the standard, and the hind clip, L, is shaped so as to fit the standard, and may have a brace running down to the point of the shovel, to which it may be welded or otherwise secured, thus forming a brace of the same kind as brace E of the main shovel C. The inner surfaces of the clips may be roughened to cause them to adhere better to the wood, and the shovel and the hind clip are bolted together, the bolts passing through notches made for the purpose in the front clip, or passing directly through the said clip. By changing the position of clips K and L the shovels G G can be turned in or out, so as to hill up or take away the soil from rows of plants. M M are the handles of the cultivator, which also form braces for the standard $a$. They are bolted near the foot of and to the standard $a$, and secured to the cross-head B by hooks $m\ m$, which in nowise interfere with the adjustability of the various parts of the invention. This mode of attaching the arms M M to the machine gives a perfect control of the same to the operator. N is a reversible hook or clevis, affixed in the middle to the cross-head B for the purpose of hitching the horses and dragging the machine backward when it is taken to or from the field. It may be attached to all kinds of cultivators for the same purpose.

I am aware that clips similar to those lettered K have been heretofore in use to adjust the shovels upon the plow-standards; but they are objectionable because firmly secured to the backs of the shovels, and cannot be removed when the shovels become broken or otherwise injured. By my improvement the clip K is independent of the shovel and can be detached at any time, when it becomes necessary.

Having thus fully described my invention, what I claim as new, and desire to secure by Letters Patent, is—

1. In a cultivator, the central adjustable standard $a$, pivoted to the beam A and connected to the clevis-bolt by means of the draft-rod D, whereby the pivot of the standard is relieved of strain, substantially as described, for the purpose specified.

2. The brace or plate E, in combination with the shovels and standards, to re-enforce the points of the shovels, as herein shown and described.

3. The combined braces and handles M M sliding loosely upon the cross-head B, in combination with the pivoted adjustable central standard $a$, as herein shown and described, for the purpose specified.

JOHN W. BLAKE.

Witnesses:
ALONZO WING,
F. E. BLAKE.

(43)